(12) United States Patent
Yano et al.

(10) Patent No.: US 7,075,604 B2
(45) Date of Patent: *Jul. 11, 2006

(54) OPTICAL FILM AND DISPLAY SYSTEM

(75) Inventors: Shuuji Yano, Ibaraki (JP); Hiroe Maeda, Ibaraki (JP); Akihiro Nishida, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/400,676

(22) Filed: Mar. 28, 2003

(65) Prior Publication Data

US 2003/0210370 A1 Nov. 13, 2003

(30) Foreign Application Priority Data

Apr. 1, 2002 (JP) ............................. 2002-098874

(51) Int. Cl.
*G02F 1/1335* (2006.01)
*G02F 1/1343* (2006.01)

(52) U.S. Cl. .................. 349/117; 349/102; 349/141

(58) Field of Classification Search .......... 349/96–103, 349/117–119, 141; 359/500
See application file for complete search history.

(56) References Cited

U.S. PATENT DOCUMENTS

| | | | | |
|---|---|---|---|---|
| 6,330,108 B1 * | 12/2001 | Nishikouji et al. | ......... | 359/499 |
| 6,606,193 B1 * | 8/2003 | Umemoto | ............... | 359/497 |
| 2004/0032547 A1 * | 2/2004 | Yano et al. | ............... | 349/96 |

FOREIGN PATENT DOCUMENTS

| | | |
|---|---|---|
| JP | 4-305602 | 10/1992 |
| JP | H04-305602 | 10/1992 |
| JP | 4-371903 | 12/1992 |
| JP | H04-371903 | 12/1992 |
| JP | 11-223728 A | 8/1999 |
| JP | 11-305217 A | 11/1999 |
| JP | 2000-039610 A | 2/2000 |
| JP | 2001-296423 A | 10/2001 |

* cited by examiner

*Primary Examiner*—Dung T. Nguyen
(74) *Attorney, Agent, or Firm*—Westerman, Hattori, Daniels & Adrian LLP (57) ABSTRACT

An optical film in which a retardation film is laminated on one side of a polarizing plate, in which a transparent protective film is laminated on both sides of a polarizer, so that an absorbing axis of the polarizing plate and a slow axis of the retardation film may be perpendicular or may be parallel to each other, wherein a value Nz represented by $Nz=(nx_1-nz_1)/(nx_1-ny_1)$ satisfies a range of 0.4 through 0.6, and an in-plane retardation $Re_1=(nx_1-ny_1)\times d_1$ is 200 through 350 nm, where, a direction of the retardation film in which an in-plane refractive index within the film surface concerned gives a maximum is defined as X-axis, a direction perpendicular to X axis is defined as Y-axis, a thickness direction of the film is defined as Z-axis, refractive indexes in axial direction are defined as $nx_1$, $ny_1$, $nz_1$, respectively, and a thickness of the film is defined as $d_1$ (nm), and the transparent protective films comprise a thermoplastic saturated norbornene resin, may realize an easily viewable display with high contrast ratio in a wide range when applied to a display system and that may provide a retardation value stabilized under conditions of high temperature or high humidity.

8 Claims, 1 Drawing Sheet

OPTICAL FILM AND DISPLAY SYSTEM

BACKGROUND OF THE INVENTION

1. Field of the Invention

The present invention relates to an optical film in which a polarizing plate and a retardation film are laminated. Specifically, the present invention relates to a display system, such as a liquid crystal display, a PDP, and a CRT, using the above-mentioned optical film. Especially an optical film of the present invention is preferably used for a liquid crystal display operating in IPS mode.

2. Description of the Background Art

Conventionally, as a liquid crystal display, there has been used a liquid crystal display in so-called TN mode in which a liquid crystal having a positive dielectric anisotropy is twisted and homogeneous aligned between substrates mutually facing to each other. However, in TN mode, even if black display is performed, optical leakage resulting from birefringence caused by liquid crystal molecule near a substrate made it difficult to obtain perfect display of black color owing to driving characteristics thereof. On the other hand, in a liquid crystal display in IPS mode, since liquid crystal molecule has almost parallel and homogeneous alignment to a substrate surface in non-driven state, light passes through the liquid crystal layer, without giving almost any change to a polarization plane, and as a result, arrangement of polarizing plates on upper and lower sides of the substrate enables almost perfect black display in non-driven state.

However, although almost perfect black display may be realized in normal direction to a panel in IPS mode, when a panel is observed in a direction shifted from normal direction, inevitable optical leakage occurs caused by characteristics of a polarizing plate in a direction shifted from an optical axis of the polarizing plates placed on upper and lower sides of the liquid crystal cell, as a result, leading to a problem of narrowing of a viewing angle.

In order to solve this problem, a polarizing plate is used in which the shift of a geometric axis of a polarizing plate given when observed from oblique direction is compensated by a retardation film. Polarizing plates providing such effect are disclosed in Japanese Patent Laid-Open Publication No. H4-305602, and Japanese Patent Laid-Open Publication No. H4-371903 official gazette. However, retardation films conventionally known have not been able to easily realize sufficient wide viewing angles.

In a polarizing plate described in the above-mentioned Japanese Patent Laid-Open Publication No. H4-305602, a retardation film is used as a protective film for a polarizer. However, although in the polarizing plate concerned viewing angle characteristics satisfactory in usual operating environment are obtained, protective film to which a polarizer is laminated is also deforms by dimensional variation of the polarizer under conditions of high temperature and high humidity. Thus, a retardation value of a retardation film used as a protective film would be shifted from a desired value, and a problem occurred that a stable effect could not be maintained.

On the other hand, in Japanese Patent Laid-Open Publication No. H4-371903, a retardation film is laminated to a polarizing plate in which a triacetyl cellulose film (TAC film) generally used as a protective film is applied. In this case, since a direct stress does not affect to a retardation film, a stable retardation value of the retardation film is obtained. However, a non-negligible retardation value of a TAC film makes design of a retardation film difficult that can compensate an axial shift. Moreover, a dimensional variation of a polarizer caused under conditions of high temperature or high humidity varies a retardation value of a TAC film as mentioned above, thus a desired purpose cannot be attained.

SUMMARY OF THE INVENTION

The present invention aims at providing an optical film with a retardation film and a polarizing plate laminated together that may realize an easily viewable display with high contrast ratio in a wide range when applied to a display system and that may provide a retardation value stabilized under conditions of high temperature or high humidity.

Moreover, the present invention aims at providing a display system, especially a liquid crystal display operating in IPS mode, which can realize an easily viewable display and has a high contrast ratio in a wide range using the above-mentioned optical film.

As a result of wholehearted examination to solve the above-mentioned problems conducted by the present inventors, an optical film described later was found out, and the present invention was completed.

That is, the present invention relates to an optical film in which a retardation film is laminated on one side of a polarizing plate, in which a transparent protective film is laminated on both sides of a polarizer, so that an absorbing axis of the polarizing plate and a slow axis of the retardation film may be perpendicular or may be parallel to each other, wherein a value Nz represented by $Nz=(nx_1-nz_1)/(nx_1-ny_1)$ satisfies a range of 0.4 through 0.6, and an in-plane retardation $Re_1=(nx_1-ny_1) \times d_1$ is 200 through 350 nm, where a direction of the retardation film in which an in-plane refractive index within the film surface concerned gives a maximum is defined as X-axis, a direction perpendicular to X axis is defined as Y-axis, a thickness direction of the film is defined as Z-axis, refractive indexes in axial direction are defined as $nx_1$, $ny_1$, $nz_1$, respectively, and a thickness of the film is defined as $d_1$ (nm)

and the transparent protective film comprises a thermoplastic saturated norbornene resin.

In the above-mentioned optical film of the present invention, when a polarizing plate is arranged in cross-Nicol state, the above-mentioned specific retardation film can solve optical leakage in a direction shifted from an optical axis. Especially, in a liquid crystal display in IPS mode, a function to compensate decrease in contrast in an oblique direction to a liquid crystal layer may be demonstrated. The retardation film has the above-mentioned value Nz of 0.4 through 0.6, and has an in-plane retardation $Re_1$ of 200 through 350 nm. In view of enhancing compensation function, a value Nz is preferably 0.45 or more, and more preferably 0.48 or more. On the other hand, a value Nz is preferably 0.55 or less, and more preferably 0.52 or less. In view of enhancing compensation function, an in-plane retardation $Re_1$ is preferably 230 nm or more, and more preferably 250 nm or more. On the other hand, an in-plane retardation $Re_1$ is preferably 300 nm or less, and more preferably 280 nm or less. A thickness $d_1$ of a retardation film is not especially limited, and usually it is approximately 40 through 100 μm, and preferably 50 through 70 μm.

The transparent protective film of the polarizing plate comprises a thermoplastic saturated norbornene resin. The thermoplastic saturated norbornene resin is excellent in heat resistance, wet endurance and weather ability. The transparent film comprising the thermoplastic saturated norbornene resin as principal components can provide a stable retardation value, even when a polarizer has some dimensional variation and, as a result, receives a stress caused by high temperature and high humidity under conditions of high temperature and high humidity. That is, an optical film that hardly gives retardation under high temperature and high humidity environment and gives little characteristic variation may be obtained.

In the above-mentioned optical film, an in-plane retardation $Re_2=(nx_2-ny_2)\times d_2$ is preferably 20 nm or less, and a thickness direction retardation $Rth=\{(nx_2+ny_2)/2-nz_2\}\times d_2$ is preferably 30 nm or less, where a direction of a transparent protective film where an in-plane refractive index within the film surface concerned gives a maximum is defined as X-axis, a direction perpendicular to X-axis is defined as Y-axis, a thickness direction of the film is defined as Z-axis, refractive indexes in axial direction are defined as $nx_2$, $ny_2$, and $nz_2$, respectively, and a thickness of the film is defined as $d_2$ (nm).

An in-plane retardation of a transparent protective film is preferably 20 nm or less, and more preferably 10 nm or less, and a thickness direction retardation is preferably 30 nm or less, and more preferably 20 nm or less. In this way, a remaining retardation adjusted small in a transparent protective film of a polarizer makes designing of a retardation film to be laminated easier, and as a result, an optical film is obtained that may demonstrate a high compensation effect by a retardation film. A thickness $d_2$ of the transparent protective film is not especially limited, and generally it is 500 μm or less, preferably 1 through 300 μm, and especially preferably 5 through 200 μm.

Moreover, the present invention relates to a display system characterized by using the above-mentioned optical film.

Furthermore, the present invention relates to a liquid crystal display in IPS mode, wherein the above-mentioned optical film is arranged on a liquid crystal substrate in a viewing side, a polarizing plate having a transparent film laminated on both sides of a polarizer is arranged on the liquid crystal substrate opposite to the viewing side, and an extraordinary refractive index direction of a liquid crystalline substance in a liquid crystal cell, and an absorbing axis of the polarizing plate concerned are parallel, in a state that voltage is not applied.

And, the present invention relates to a liquid crystal display in IPS mode, wherein a polarizing plate having a transparent protective film laminated on both sides of a polarizer is arranged on a liquid crystal substrate in a viewing side, the above-mentioned optical film is arranged on a liquid crystal substrate opposite to the viewing side, and an extraordinary refractive index direction of a liquid crystalline substance in a liquid crystal cell, and an absorbing axis of the optical film concerned are perpendicular, in a state where voltage is not applied.

In the above-mentioned liquid crystal display in IPS mode, the transparent protective film of the polarizing plate preferably comprises a thermoplastic saturated norbornene resin.

In the above-mentioned liquid crystal display in IPS mode, an in-plane retardation $Re_2=(nx_2-ny_2)\times d_2$ is 20 nm or less, and a thickness direction retardation $Rth=\{(nx_2+ny_2)/2-nz_2\}\times d_2$ is 30 nm or less, where a direction of a transparent protective film in which an in-plane refractive index within the film surface concerned gives a maximum is defined as X-axis, a direction perpendicular to X-axis is defined as Y-axis, a thickness direction of the film is defined as Z-axis, refractive indexes in axial direction are defined as $nx_2$, $ny_2$, and $nz_2$, respectively, and a thickness of the film is defined as $d_2$ (nm).

As a display system of the present invention, a liquid crystal display in IPS mode is suitable. When an optical film in which the above-mentioned polarizing plate and a retardation film having a specific retardation value are laminated is arranged on at least one surface of a liquid crystal cells in IPS mode, optical leakage at the time of black display conventionally occurred in a liquid crystal display in IPS mode may be reduced. This type of liquid crystal display in IPS mode has a high contrast ratio over all directions, and may realize easily viewable display with a wide viewing angle.

Especially, when a transparent protective film comprising the thermoplastic saturated norbornene resin as principal components is used as the above-mentioned transparent protective film of a polarizing plate arranged on a liquid crystal cell surface, a liquid crystal display that has a wide viewing angle and may secure a stable retardation may suitably be obtained.

DESCRIPTION OF THE PREFERRED EMBODIMENTS

Figure 1:
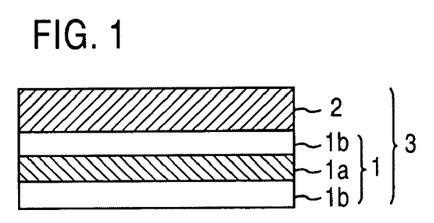
FIG. 1 is an example of a sectional view of an optical film of the present invention.

Hereinafter, an optical film of the present invention and a display system will be described with reference to drawings. As is shown in FIG. 1, the optical film of the present invention, a retardation film 2 is laminated to one side of a polarizing plate 1 in which transparent protective films 1*b* are laminated to both sides of a polarizer 1*a*. The polarizing plate 1 and the retardation film 2 are laminated so that an absorbing axis of the polarizing plate 1, and a slow axis of the retardation film 2 may be perpendicular or may be parallel to each other. In view of continuous lamination at the time of laminating process, the polarizing plate 1 and the retardation film 2 may be laminated so that an absorbing axis of the polarizing plate 1 and a slow axis of the retardation film 2 may be parallel.

As a retardation film, a film satisfying the above-mentioned value Nz and in-plane retardation $Re_1$ may be used without any limitation. For example, a high polymer film showing birefringence, and an oriented liquid crystal polymer film etc. may be mentioned.

Among high polymers are, for example: polycarbonate; polyolefins, such as and polypropylene; polyesters, such as polyethylene terephthalate and polyethylenenaphthalate; cycloaliphatic polyolefins, such as poly norbornene etc.; polyvinyl alcohols; polyvinyl butyrals; polymethyl vinyl ethers; poly hydroxyethyl acrylates; hydroxyethyl celluloses; hydroxypropyl celluloses; methylcelluloses; polyallylates; polysulfones; polyether sulfones; polyphenylene sulfides; polyphenylene oxides; poly allyl sulfones; polyvinyl alcohols; polyamides; polyimides; polyvinyl chlorides; cellulose based polymers; or various kinds of binary copolymers; ternary copolymers; and graft copolymers of the above-mentioned polymers; or their blended materials. A retardation film may be obtained by adjusting a refractive index in a thickness direction using a method in which a high polymer film is biaxially stretched in a planar direction, or a method in which a high polymer film is uniaxially or biaxially stretched in a planar direction, and also stretched in a thickness direction etc. And a retardation film may be obtained using, for example, a method in which a heat shrinking film is adhered to a polymer film, and then the combined film is stretched and/or shrunken under a condition of being influenced by a shrinking force to obtain tilted orientation.

As liquid crystalline polymers, for example, various kinds of principal chain type or side chain type polymers may be mentioned in which conjugated linear atomic groups (mesogen) demonstrating liquid crystal alignment property are introduced into a principal chain and a side chain of the polymer. As illustrative examples of principal chain type liquid crystalline polymers, for example, nematic orientated polyester based liquid crystalline polymers having a structure where mesogenic group is bonded by a spacer section giving flexibility, discotic polymers, and cholesteric polymers, etc. may be mentioned. As illustrative examples of side chain type liquid crystalline polymers, there may be mentioned a polymer having polysiloxanes, polyacrylates, polymethacrylates, or poly malonates as a principal chain skeleton, and having a mesogen section including a para-substituted cyclic compound unit giving nematic orientation through a spacer section comprising conjugated atomic group as side chain. As preferable examples of oriented films obtained from these liquid crystalline polymers, there may be mentioned a film whose surface of a thin film made of polyimide or polyvinyl alcohol etc. formed on a glass plate is treated by rubbing, and a film obtained in a method that a solution of a liquid crystalline polymer is applied on an oriented surface of a film having silicon oxide layer vapor-deposited by an oblique vapor deposition method and subsequently the film is heat-treated to give orientation of the liquid crystal polymer, and among them, a film given tilted orientation is especially preferable.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As materials forming a transparent protective film provided in the above-mentioned polarizer, the thermoplastic saturated norbornene resin is used. The transparent protective film comprising the thermoplastic saturated norbornene resin hardly gives retardation, when the film is affected by a stress caused by dimensional variation of the polarizer.

The thermoplastic saturated norbornene resin has cyclo-olefin as a main structure, and has substantially not carbon-carbon double bond. The thermoplastic saturated norbornene resin is exemplified, ZEONEX, ZEONOR (registered trade mark) manufactured by ZEON CORPORATION, ARTON (registered trade mark) manufactured by JSR CORPORATION.

As a material other than forming the above protective film, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type may be mentioned.

As the opposite side of the polarizing-adhering surface above-mentioned protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Isocyanate based adhesives, polyvinyl alcohol based adhesives, gelatin based adhesives, vinyl based latex based, aqueous polyester based adhesives, and etc. may be used for adhesion processing for the above-mentioned polarizers and transparent protective films.

A laminating method for the above-mentioned retardation films and polarizing plates is not especially limited, and lamination may be carried out using pressure sensitive adhesive layers etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

In addition, in the present invention, ultraviolet absorbing property may be given to the above-mentioned each layer, such as an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention is suitably used for a liquid crystal display in IPS mode. A liquid crystal display in IPS mode has a liquid crystal cell comprising: a pair of substrates sandwiching a liquid crystal layer; a group of electrodes formed on one of the above-mentioned pair of substrates; a liquid crystal composition material layer having dielectric anisotropy sandwiched between the above-mentioned substrates; an orientation controlling layer that is formed on each of surfaces, facing each other, of the above-mentioned pair of substrates in order to orient molecules of the above-mentioned liquid crystal composition material in a predetermined direction, and driving means for applying driver voltage to the above-mentioned group of electrodes. The above-mentioned group of electrodes has alignment structure arranged so that parallel electric field may mainly be applied to an interface to the above-mentioned orientation controlling layer and the above-mentioned liquid crystal composition material layer.

Figure 2A:
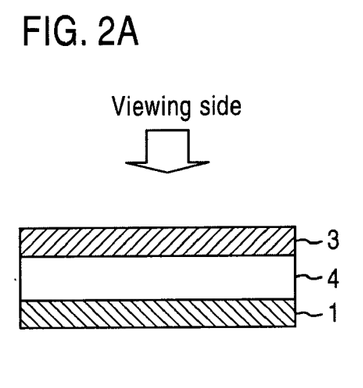
FIG. 2 is a conceptual diagram of a liquid crystal display of the present invention.
Figure 2B:
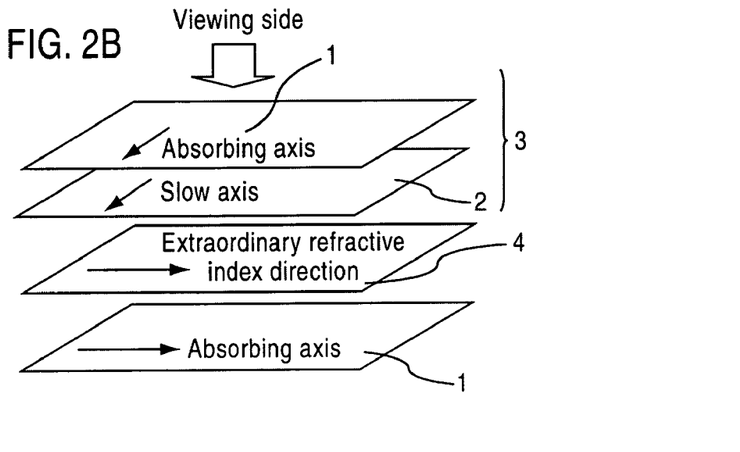
Figure 3A:
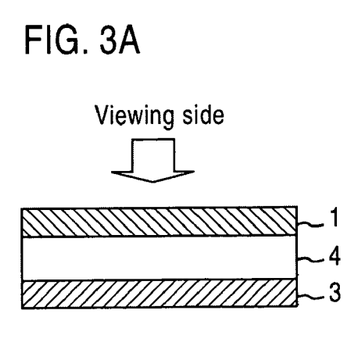
FIG. 3 is a conceptual diagram of a liquid crystal display of the present invention.
Figure 3B:
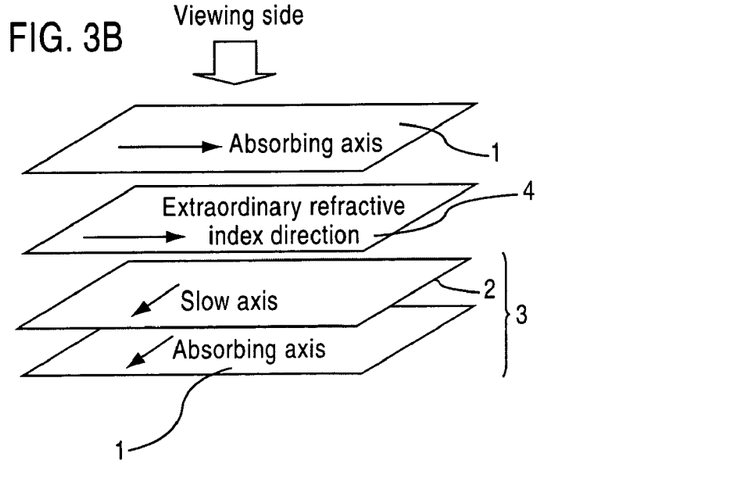

As is shown in FIG. 2 and FIG. 3, an optical film 3 of the present invention is arranged on a viewing side or on a light incident side of a liquid crystal cell. For the optical film 3, it is preferable that a retardation film 2 side is arranged to face to a liquid crystal cell 4 side. A polarizing plate 1 is arranged on an opposite side of the liquid crystal cell 4 to which the optical film 3 has been arranged. An absorbing axis of the polarizing plate 1 arranged on both sides of the liquid crystal substrate 4 and an absorbing axis of the optical film 3 (polarizing plate 1) are arranged so that they may be perpendicular to each other. In the polarizing plate 1, a constitution is used that a transparent protective film 2b is laminated on both sides of a similar polarizer 1a as a polarizer used for the optical film 3.

As is shown in FIG. 2, when the optical film 3 is arranged on a viewing side of the liquid crystal cell 4 in IPS mode, on the liquid crystal substrate 4 opposite to the viewing side (a light incident side), the polarizing plate 1 is preferably arranged so that an extraordinary refractive index direction of liquid crystalline substance in the liquid crystal cell 4 and an absorbing axis of the polarizing plate 1 may be parallel in a state where voltage is not applied.

Moreover as is shown in FIG. 3, when an optical film 3 is arranged on a light incident side of a liquid crystal cell 4 in IPS mode, a polarizing plate 1 is preferably arranged on a liquid crystal substrate 4 in a viewing side so that an extraordinary refractive index direction of liquid crystalline substance in the liquid crystal cell 4 and an absorbing axis of the optical film 3 may be perpendicular to each other in a state where voltage is not applied.

The above-mentioned optical film and polarizing plate may be used in a state where other optical films are laminated thereto on the occasion of practical use. The optical films used here are not especially limited, and, for example, one layer or two or more layers of optical films that may be used for formation of liquid crystal displays, such as reflectors, semitransparent plates, and retardation plates (including half wavelength plates and quarter wavelength plates etc.) may be used. Especially, a reflection type polarizing plate or a semitransparent type polarizing plate in which a reflector or a semitransparent reflector is further laminated to a polarizing plate, and a polarizing plate in which a brightness enhancement film is further laminated to a polarizing plate are preferable.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transreflective type polarizing plate may be obtained by preparing the above-mentioned reflective layer as a transreflective type reflective layer, such as a half-mirror etc. that reflects and transmits light. A transreflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transreflective type polarizing plate. That is, the transreflective type polarizing plate is useful to obtain of a liquid crystal display of the type that saves energy of light sources, such as a back light, in a well-lighted atmosphere, and can be used with a built-in light source if needed in a comparatively dark atmosphere etc.

The polarizing plate on which the retardation plate is laminated may be used as elliptically polarizing plate or circularly polarizing plate. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an oriented film of cholesteric liquid-crystal polymer; a film that has the characteristics of reflecting a circularly polarized light with either left-handed or right-handed rotation and transmitting other light, such as a film on which the oriented cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multilayered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transreflective type polarizing plate is combined with above described retardation plate respectively.

Although optical films and polarizing plates having the above-mentioned optical films laminated thereto may be formed using methods in which they are laminated sequentially and separately in a manufacturing process of liquid crystal displays, films that are beforehand laminated and constituted as an optical film are superior in stability of quality, assembly work, etc., thus leading to advantages of improved manufacturing processes for liquid crystal displays. Suitable adhering means, such as adhesive layer, may be used for lamination for layers. In adhesion of the above-mentioned polarizing plate and other optical films, the optical axes may be arranged so that they have proper arrangement angles based on desired retardation characteristics etc.

Formation of a liquid crystal display may be carried out according to conventional methods. A liquid crystal display is generally formed using methods in which component parts, such as lighting systems, are suitably assembled, and driving circuits are subsequently incorporated, if necessary, and the present invention is not especially limited except that the above-mentioned optical film is used, and any methods according to conventional methods may be adopted. Also in liquid crystal cells, for example, liquid crystal cells of arbitrary type, such as VA type and $\pi$ type, other than IPS mode type illustrated above may be used.

As liquid crystal displays, suitable liquid crystal displays, such as types using lighting systems or reflectors, may be formed. Furthermore, on the occasion of formation of liquid crystal displays, one layer of two or more layers of suitable parts, such as diffusion plates, anti-glare layer coatings, protective plates, prism arrays, lens array sheets, optical diffusion plates, and backlights, may be arranged in suitable position.

EXAMPLE

Although the present invention will hereinafter be described in detail with reference to Examples, the present invention is not limited by the Examples.

Refractive indexes nx, ny, and nz of a retardation film were measured by an automatic birefringence measuring apparatus (manufactured by Oji Scientific Instruments KOBRA21ADH) to calculate an Nz and an in-plane retardation $Re_1$. And, similar measurement was carried out also for a transparent protective film, and an in-plane retardation $Re_2$ and a thickness direction retardation Rth were calculated.

Example 1

(Transparent Protective Film)

Thermoplastic saturated norbornene resin (ZEONOR1600R manufactured by ZEON) was fed to single screw extruder, subsequently extruded at 275 to 290° C. to obtain a transparent protective film having a thickness of 50 μm. The transparent protective film thus obtained showed 4 nm of in-plane retardation $Re_2$ and 20 nm of thickness direction retardation Rth.

(Polarizing Plate)

The above-mentioned transparent protective film was laminated to both sides of a film (polarizer: 20 μm), in which iodine was absorbed to a poly vinylalcohol based film and was subsequently stretched, using an adhesive to produce a polarizing plate.

(Optical Film)

A polycarbonate film was stretched and a retardation film having a thickness of 60 μm, an in-plane retardation $Re_1$ of 260 nm, and Nz=0.5 was obtained. This retardation film and the above-mentioned polarizing plate were laminated using a pressure sensitive adhesive so that a slow axis of the retardation film and an absorbing axis of the polarizing plate might be parallel to produce an optical film.

(Liquid Crystal Display)

As is shown in FIG. 2, a pressure sensitive adhesive laminated the optical film so that a retardation film side of the optical film might be arranged on a face of a viewing side of a liquid crystal cell in IPS mode. On the other hand, the polarizing plate was laminated to a side opposite to the liquid crystal cell using a pressure sensitive adhesive to produce a liquid crystal display. The polarizing plate on a viewing side was laminated so that an extraordinary refractive index direction of a liquid crystalline composition in the liquid crystal cell and an absorbing axis of the polarizing plate might be perpendicular to each other when voltage was not applied. And the absorbing axis of the polarizing plate and an absorbing axis of the optical film were arranged so that they may be perpendicular to each other.

(Evaluation)

In this liquid crystal display, a contrast ratio in a direction of gradient to make 70 degree from normal was measured in a direction to make an angle of 45 degrees to optical axes perpendicular to each other of polarizing plates to obtain a contrast ratio of 35. Measurement of the contrast ratio was carried out using EZ Contrast (product manufactured by ELDIM). And, after this liquid crystal display was maintained under condition of 60° C. and 95% RH for 200 hours, irregularity within a surface of black display was confirmed by visual viewing, and irregularity was hardly observed.

Example 2

(Transparent Protective Film)

Thermoplastic saturated norbornene resin (ARTON manufactured by JSR) was dissolved in methylene chloride to a solution. Subsequently, the solution was applied to casting method to obtain a transparent protective film having a thickness of 40 μm. The transparent protective film thus obtained showed 4 nm of in-plane retardation $Re_2$ and 22 nm of thickness direction retardation Rth.

(Polarizing Plate)

The above-mentioned transparent protective film was laminated to both sides of a film (polarizer: 20 μm), in which iodine was absorbed to a poly vinylalcohol based film and was subsequently stretched, using an adhesive to produce a polarizing plate.

(Optical Film)

The polycarbonate retardation film and the above-mentioned polarizing plate were laminated using a pressure sensitive adhesive so that a slow axis of the retardation film and an absorbing axis of the polarizing plate might be parallel to produce an optical film.

(Liquid Crystal Display)

As is shown in FIG. 2, a pressure sensitive adhesive laminated the optical film so that a retardation film side of the optical film might be arranged on a face of a viewing side of a liquid crystal cell in IPS mode. On the other hand, the polarizing plate was laminated to a side opposite to the liquid crystal cell using a pressure sensitive adhesive to produce a liquid crystal display. The polarizing plate on a viewing side was laminated so that an extraordinary refractive index direction of a liquid crystalline composition in the liquid crystal cell and an absorbing axis of the polarizing plate might be perpendicular to each other when voltage was not applied. And the absorbing axis of the polarizing plate and an absorbing axis of the optical film were arranged so that they may be perpendicular to each other.

(Evaluation)

In this liquid crystal display, a contrast ratio in a direction of gradient to make 70 degree from normal was measured in a direction to make an angle of 45 degrees to optical axes perpendicular to each other of polarizing plates to obtain a contrast ratio of 35. And, after this liquid crystal display was maintained under condition of 60° C. and 95% RH for 200 hours, irregularity within a surface of black display was confirmed by visual viewing, and irregularity was hardly observed.

Comparative Example 1

A triacetyl cellulose film, as a transparent protective film, was laminated to both sides of a film (polarizer: 20 μm) in which iodine was absorbed to a poly vinylalcohol based film and subsequently stretched using an adhesive and a polarizing plate was produced. The triacetyl cellulose film showed a thickness of 80 μm, an in-plane retardation $Re_2$ of 4 nm, and a thickness direction retardation Rth of 45 nm.

The polarizing plate was laminated to both sides of a liquid crystal cell in IPS mode as in Example 1 using a pressure sensitive adhesive to produce a liquid crystal display. And polarizing plates arranged on both sides of the liquid crystal cell were arranged so that polarization axes might be perpendicular to each other.

In this liquid crystal display, a contrast ratio in a direction of gradient to make 70 degree from normal was measured in a direction to make an angle of 45 degrees to optical axes perpendicular to each other of polarizing plates to obtain a contrast ratio of 9.

Comparative Example 2

A similar polarizing plate used in Example 1 was laminated to both sides of a similar liquid crystal cell in IPS mode as in Example 1 using a pressure sensitive adhesive to produce a liquid crystal display. And polarizing plates arranged on both sides of the liquid crystal cell were arranged so that polarization axes might be perpendicular to each other.

In this liquid crystal display, a contrast ratio in a direction of gradient to make 70 degree from normal was measured in a direction to make an angle of 45 degrees to optical axes perpendicular to each other of polarizing plates to obtain a contrast ratio of 20.

Comparative Example 3

The retardation film made of polycarbonate in Example 1 was directly laminated to a polarizer so that the slow axis might be parallel to the absorbing axis of the polarizer to produce a polarization optical film. Thus obtained polarization optical film was laminated using a pressure sensitive adhesive so that a retardation film side might be arranged on a face of a viewing side of a liquid crystal cell in IPS mode. On the other hand, a polarizing plate used in Example 1 was laminated to an opposite side using a pressure sensitive adhesive to produce a liquid crystal display.

In this liquid crystal display, a contrast ratio in a direction of gradient to make 70 degree from normal was measured in a direction to make an angle of 45 degrees to optical axes perpendicular to each other of polarizing plates to obtain a contrast ratio of 50. And, after this liquid crystal display was maintained under condition of 60° C. and 95% RH for 200 hours, irregularity within a surface of black display was confirmed by visual viewing, and irregularity by variation of a retardation value of the retardation film caused by shrinkage of the polarizing plate was observed.

Comparative Example 4

A retardation film having an in-plane retardation of 100 nm and Nz=0.5, obtained by stretching a polycarbonate film, was laminated to a polarizing plate obtained in Example 1 using a pressure sensitive adhesive so that a slow axis of the retardation film and an absorbing axis of the polarizing plate might be parallel to produce a polarization optical film. The polarization optical film thus produced was laminated using a pressure sensitive adhesive so that a retardation film side might be arranged on a face of a viewing side of the liquid crystal cell in IPS mode, as in Example 1. On the other hand, a polarizing plate used in Example 1 was laminated to an opposite side using a pressure sensitive adhesive to produce a liquid crystal display.

In this liquid crystal display, a contrast ratio in a direction of gradient to make 70 degree from normal was measured in a direction to make an angle of 45 degrees to optical axes perpendicular to each other of polarizing plates to obtain a contrast ratio of 15.

Comparative Example 5

A retardation film having an in-plane retardation of 260 nm and Nz=1.0, obtained by stretching a polycarbonate film, was laminated to a polarizing plate obtained in Example 1 using a pressure sensitive adhesive so that a slow axis of the retardation film and an absorbing axis of the polarizing plate might be parallel to produce a polarization optical film. The polarization optical film thus produced was laminated using a pressure sensitive adhesive so that a retardation film side might be arranged on a face of a viewing side of the liquid crystal cell in IPS mode, as in Example 1. On the other hand, a polarizing plate used in Example 1 was laminated to an opposite side using a pressure sensitive adhesive to produce a liquid crystal display.

In this liquid crystal display, a contrast ratio in a direction of gradient to make 70 degree from normal was measured in a direction to make an angle of 45 degrees to optical axes perpendicular to each other of polarizing plates to obtain a contrast ratio of 8.

Comparative Example 6

A retardation film having an in-plane retardation of 120 nm and Nz=1.0, obtained by stretching a polycarbonate film, was laminated to a polarizing plate made in Example 1 using a pressure sensitive adhesive so that a slow axis of the retardation film and an absorbing axis of the polarizing plate might be parallel to produce a polarization optical film. The polarization optical film thus produced was laminated using a pressure sensitive adhesive so that a retardation film side might be arranged on a face of a viewing side of the liquid crystal cell in IPS mode, as in Example 1. On the other hand, a polarizing plate used in Example 1 was laminated to an opposite side using a pressure sensitive adhesive to produce a liquid crystal display.

In this liquid crystal display, a contrast ratio in a direction of gradient to make 70 degree from normal was measured in a direction to make an angle of 45 degrees to optical axes perpendicular to each other of polarizing plates to obtain a contrast ratio of 8.

Comparative Example 7

A triacetyl cellulose film, as a transparent protective film, was laminated to both sides of a film (polarizer: 20 μm) in which iodine was absorbed to a poly vinylalcohol based film and subsequently stretched, using an adhesive, and a polarizing plate was produced. The retardation film made of polycarbonate obtained in Example 1 was laminated to the polarizing plate concerned, using a pressure sensitive adhesive, so that a slow axis of the retardation film and an absorbing axis of the polarizing plate might be parallel to produce a polarization optical film. The polarization optical film thus produced was laminated, using a pressure sensitive adhesive, so that a retardation film side might be arranged on a face of a viewing side of the liquid crystal cell in IPS mode, as in Example 1. On the other hand, a polarizing plate used in Example 1 was laminated to an opposite side using a pressure sensitive adhesive to produce a liquid crystal display.

In this liquid crystal display, a contrast ratio in a direction of gradient to make 70 degree from normal was measured in a direction to make an angle of 45 degrees to optical axes perpendicular to each other of polarizing plates to obtain a contrast ratio of 4. And, after this liquid crystal display was maintained under condition of 60° C. and 95% RH for 200 hours, irregularity within a surface of black display was confirmed by visual viewing, and irregularity by variation of a retardation value of the retardation film caused by shrink of the polarizing plate was observed.

What is claimed is:

1. An optical film comprising a retardation film and a polarizing plate, wherein, in the polarizing plate, a first transparent protective film is laminated on one side of a polarizer and a second transparent protective film is laminated on the other side of a polarizer, and the retardation film is laminated on one side of the polarizing plate, so that an absorbing axis of the polarizing plate and a slow axis of the retardation film may be perpendicular or may be parallel to each other, wherein a value Nz represented by $Nz=(nx_1-nz_1)/(nx_1-ny_1)$ of the retardation film satisfies a range of 0.4 through 0.6, and an in-plane retardation $Re_1=(nx_1-ny_1)\times d_1$ of the retardation film is 200 through 350 nm, where a direction of the retardation film in which an in-plane refractive index within the film surface concerned gives a maximum is defined as X-axis, a direction perpendicular to X axis is defined as Y-axis, a thickness direction of the film is defined as Z-axis, refractive indexes in axial direction are defined as $nx_1$, $ny_1$, $nz_1$, respectively, and a thickness of the film is defined as $d_1$ (nm), and the transparent protective films comprise a thermoplastic saturated norbornene resin, wherein an in-plane retardation $Re_2=(nx_2-ny_2)\times d_2$ of each of the first and second transparent protective films is 20 nm or less, and a thickness direction retardation $Rth=\{(nx_2+ny_2)/2-nz_2\}\times d_2$ of each of the first and second transparent protective films is 30 nm or less, where a direction of each of the first and second transparent protective films in which an in-plane refractive index within the film surface concerned gives a maximum is defined as X-axis, a direction perpendicular to X-axis is defined as Y-axis, a thickness direction of the film is defined as Z-axis, refractive indexes in axial direction are defined as $nx_2$, $ny_2$, and $nz_2$, respectively, and a thickness of the film is defined as $d_2$ (nm).

2. A display system, wherein the optical film according to claim 1 is used.

3. A liquid crystal display in IPS mode, wherein an optical film is arranged on a liquid crystal substrate on a viewing side, the optical film comprising a retardation film and a first polarizing plate, wherein, in the first polarizing plate, a first transparent protective film is laminated on one side of a first polarizer and a second transparent protective film is laminated on the other side of the first polarizer, and the retardation film is laminated on one side of the first polarizing plate, so that an absorbing axis of the first polarizing plate and a slow axis of the retardation film may be perpendicular or may be parallel to each other, wherein a value Nz represented by $Nz=(nx_1-nz_1)/(nx_1-ny_1)$ of the retardation film satisfies a range of 0.4 through 0.6, and an in-plane retardation $Re_1=(nx_1-ny_1)\times d_1$ of the retardation film is 200 through 350 nm, where a direction of the retardation film in which an in-plane refractive index within the film surface concerned gives a maximum is defined as X-axis, a direction perpendicular to X axis is defined as Y-axis, a thickness direction of the film is defined as Z-axis, refractive indexes in axial direction are defined as $nx_1$, $ny_1$, $nz_1$, respectively, and a thickness of the film is defined as $d_1$ (nm), and the first and second transparent protective films comprise a thermoplastic saturated norbornene resin, a second polarizing plate having a third transparent protective film laminated on one side of a second polarizer and a fourth transparent protective film laminated on the other side of the second polarizer is arranged on a liquid crystal substrate opposite to the viewing side, and an extraordinary refractive index direction of a liquid crystalline substance in a liquid crystal cell, and an absorbing axis of the second polarizing plate are parallel, in a state where voltage is not applied.

4. The liquid crystal display in IPS mode according to claim 3, wherein the third and fourth transparent protective films of the second polarizing plate comprise a thermoplastic saturated norbornene resin.

5. The liquid crystal display in IPS mode according to claim 3, wherein an in-plane retardation $Re_2=(nx_2-ny_2)\times d_2$ of each of the first and second transparent protective films is 20 nm or less, and a thickness direction retardation $Rth=\{(nx_2+ny_2)/2-nz_2\}\times d_2$ of each of the first and second transparent protective films is 30 nm or less, where a direction of each of the first and second transparent protective films where an in-plane refractive index within the film surface concerned gives a maximum is defined as X-axis, a direction perpendicular to X-axis is defined as Y-axis, a thickness direction of the film is defined as Z-axis, refractive indexes in axial direction are defined as $nx_2$, $ny_2$, and $nz_2$, respectively, and a thickness of the film is defined as $d_2$ (nm).

6. A liquid crystal display in IPS mode, wherein an optical film is arranged on a liquid crystal substrate opposite to the viewing side, the optical film comprising a retardation film and a first polarizing plate, wherein, in the polarizing plate, a first transparent protective film is laminated on one side of a first polarizer and a second transparent protective film is laminated on the other side of the first polarizer, and the retardation film is laminated on one side of the first polarizing plate, so that an absorbing axis of the first polarizing plate and a slow axis of the retardation film may be perpendicular or may be parallel to each other, wherein a value Nz represented by $Nz=(nx_1-nz_1)/(nx_1-ny_1)$ of the retardation film satisfies a range of 0.4 through 0.6, and an in-plane retardation $Re_1=(nx_1-ny_1)\times d_1$ of the retardation film is 200 through 350 nm, where a direction of the retardation film in which an in-plane refractive index within the film surface concerned gives a maximum is defined as X-axis, a direction perpendicular to X axis is defined as Y-axis, a thickness direction of the film is defined as Z-axis, refractive indexes in axial direction are defined as $nx_1$, $ny_1$, $nz_1$, respectively, and a thickness of the film is defined as $d_1$ (nm), and the first and second transparent protective films comprise a thermoplastic saturated norbornene resin, a second polarizing plate having a third transparent protective film laminated on one side of a second polarizer and a fourth transparent protective film laminated on the other side of the second polarizer is arranged on a liquid crystal substrate on a viewing side, and an extraordinary refractive index direction of a liquid crystalline substance in the liquid crystal cell, and an absorbing axis of the optical film concerned are perpendicular, in a state where voltage is not applied.

7. The liquid crystal display in IPS mode according to claim 6, wherein the third and fourth transparent protective films of the polarizing plate comprise a thermoplastic saturated norbornene resin.

8. The liquid crystal display in IPS mode according to claim 6, wherein an in-plane retardation $Re_2=(nx_2-ny_2)\times d_2$ of each of the first and second transparent protective films is 20 nm or less, and a thickness direction retardation $Rth=\{(nx_2+ny_2)/2-nz_2\}\times d_2$ of each of the first and second transparent protective films is 30 nm or less, where a direction of each of the first and second transparent protective films where an in-plane refractive index within the film surface concerned gives a maximum is defined as X-axis, a direction perpendicular to X-axis is defined as Y-axis, a thickness direction of the film is defined as Z-axis, refractive indexes in axial direction are defined as $nx_2$, $ny_2$, and $nz_2$, respectively, and a thickness of the film is defined as $d_2$ (nm).

* * * * *